United States Patent
Mizuno et al.

(10) Patent No.: US 7,350,022 B2
(45) Date of Patent: Mar. 25, 2008

(54) STORAGE SYSTEM AND STORAGE CONTROL METHOD WITH A PASSWORD FOR DEVICE MANAGEMENT

(75) Inventors: Makio Mizuno, Sagamihara (JP);
Akira Fujibayashi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 529 days.

(21) Appl. No.: 10/996,297

(22) Filed: Nov. 22, 2004

(65) Prior Publication Data

US 2006/0064560 A1 Mar. 23, 2006

(30) Foreign Application Priority Data

Sep. 22, 2004 (JP) .............................. 2004-275447

(51) Int. Cl.
*G06F 12/14* (2006.01)
(52) U.S. Cl. ...................... 711/112; 711/156; 711/167; 713/183; 713/184; 726/17
(58) Field of Classification Search ................ 711/112, 711/156, 167; 713/183, 184; 726/17
See application file for complete search history.

(56) References Cited

U.S. PATENT DOCUMENTS

| 5,375,243 | A | * | 12/1994 | Parzych et al. ................ 726/17 |
| 5,552,776 | A | * | 9/1996 | Wade et al. ................ 340/5.74 |
| 6,640,278 | B1 | * | 10/2003 | Nolan et al. .................... 711/6 |
| 6,654,830 | B1 | * | 11/2003 | Taylor et al. .................. 710/74 |
| 6,912,627 | B2 | * | 6/2005 | Matsunami et al. ......... 711/154 |
| 7,082,462 | B1 | * | 7/2006 | Matsunami et al. ......... 709/223 |
| 7,093,124 | B2 | * | 8/2006 | Girard ........................ 713/164 |
| 7,099,904 | B2 | * | 8/2006 | Nakatsuka ................... 707/205 |
| 7,206,832 | B2 | * | 4/2007 | Matsunami et al. ......... 709/223 |
| 2005/0021727 | A1 | * | 1/2005 | Matsunami et al. ......... 709/223 |
| 2005/0050226 | A1 | * | 3/2005 | Larson ........................ 709/245 |
| 2005/0192923 | A1 | * | 9/2005 | Nakatsuka ..................... 707/1 |

FOREIGN PATENT DOCUMENTS

| JP | 11-085407 | 3/1999 |
| JP | 2004-078539 | 3/2004 |

OTHER PUBLICATIONS

Peter T. McLean, Information Technology-AT Attachment-3 Interface (ATA-3), working Draft X3T13<2008D, 1997, 33-35.

* cited by examiner

*Primary Examiner*—Stephen C. Elmore
(74) *Attorney, Agent, or Firm*—Townsend and Townsend and Crew LLP

(57) ABSTRACT

In a storage system, which includes a storage device and a disk control device that controls data transfer between the storage device and a host computer, a security of storage medium making up the storage device is enhanced. For this purpose, the storage system is provided with a password management table, that manages a password for the entire storage device, for each storage medium or for each logical device, and also with a function of setting and unlocking the password for the entire storage device, for each storage medium or for each logical device.

9 Claims, 15 Drawing Sheets

FLOW CHART FOR SETTING PASSWORD WHEN STORAGE SYSTEM POWER IS TURNED ON, WITH PASSWORDS MANAGED BY MANAGEMENT TERMINAL

EXAMPLE CONFIGURATION OF STORAGE SYSTEM

ANOTHER CONFIGURATION OF STORAGE SYSTEM

STILL ANOTHER CONFIGURATION OF STORAGE SYSTEM

SCHEMATIC DIAGRAM OF STORAGE DEVICE

FIG. 5

| STORAGE MEDIUM POSITION | LOGICAL DEVICE IDENTIFIER | PW | RANGE | SETTING/ UNLOCKING |
|---|---|---|---|---|
| 00 | 0 | abc | LOGICAL DEVICE | ENABLED |
| 01 | 0 | def | LOGICAL DEVICE | ENABLED |
| 02 | 1 | efg | STORAGE MEDIUM | ENABLED |
| ... |  | ... |  | ... |
|  |  |  |  |  |
| mn | 31 | zzz | STORAGE MEDIUM | DISABLED |

510 — STORAGE MEDIUM POSITION
515 — LOGICAL DEVICE IDENTIFIER
520 — PW
525 — RANGE
530 — SETTING/UNLOCKING

505 PASSWORD MANAGEMENT TABLE

EXAMPLE OF PASSWORD MANAGEMENT TABLE

FLOW CHART FOR SETTING PASSWORD
WHEN STORAGE SYSTEM DOOR IS OPENED

FLOW CHART FOR SETTING PASSWORD WHEN FIRST INPUT/OUTPUT REQUEST FROM HOST IS RECEIVED

FLOW CHART FOR SETTING PASSWORD ON DESTINATION STORAGE SYSTEM WHEN INFORMATION IS TRANSFERRED OR COPIED FROM ONE STORAGE SYSTEM TO ANOTHER

FLOW CHART FOR UNLOCKING PASSWORD WHEN STORAGE SYSTEM POWER IS TURNED ON

FLOW CHART FOR UNLOCKING PASSWORD WHEN FIRST INPUT/OUTPUT REQUEST IS RECEIVED FROM HOST

FLOW CHART FOR UNLOCKING PASSWORD WHEN
LOG-IN REQUEST IS RECEIVED FROM HOST

FLOW CHART FOR UNLOCKING PASSWORD WHEN TRANSFERRED INFORMATION IS REFERENCED

FLOW CHART FOR READING DATA AFTER PASSWORD HAS BEEN SET

STORAGE SYSTEM AND STORAGE CONTROL METHOD WITH A PASSWORD FOR DEVICE MANAGEMENT

INCORPORATION BY REFERENCE

The present application claims priority from Japanese application JP2004-275447 filed on Sep. 22, 2004, the content of which is hereby incorporated by reference into this application.

BACKGROUND OF THE INVENTION

The present invention relates to a security technology for a storage system comprising a storage device having one or more disks and a disk controller to control the storage device.

In a variety of fields, such as securities and medicine, laws have been introduced to regulate a preservation of data, such as electronic recordings of e-mails and their communication history, and a period of data retention. For instance, in the United States, there are the Sarbanes-Oxley Act (SOX) for corporate governance and Securities and Exchange Commission (SEC) 17a-4 adopted by the U.S. Securities and Exchange Commission. Information referred to in these laws and rules often includes customer information and corporate confidential information and thus must be protected for privacy to prevent leakage of information. These information, while they must be able to be retained for a long period of time, must also be able to be retrieved quickly when needed. Data intended to be stored for a long period has not so high a probability of being referenced and it is general practice to store them in a low-cost tape device.

However, the requirement of retrieving data quickly when needed is difficult to meet with a low-performance tape device. Under these circumstances, there is a growing demand for a storage system capable of storing such data as requires some retrieval performance on the part of the storage device, i.e., data not so high in a possibility of being referenced as those handled in a high-end storage with high performance and high reliability but not so low as those stored in a low-end storage such as a tape device. A solution has emerged which seeks to reduce management cost by optimizing a storage location according to the nature of data at different moments in time. This solution is called a data lifecycle management or an information lifecycle management.

To implement this solution, storage venders have come out with a product called a near-line storage. Many near-line storage products use Serial ATA (SATA) (also called attachment IDE) drives. The reason for the use of SATA drives for the near-line storage is that although they have somewhat less performance than fiber channel drives mostly used in high-end storage, the SATA drives have a higher performance but with somewhat higher cost than low-cost, low-end tape storage. Even in the high-end storage there is a possibility of the SATA drives being used to allow for the data lifecycle management within the high-end storage facility. In the storage system that handles data of the nature described above, it is necessary to prevent information leakage as described earlier. As one of security technologies for storage systems, a LUN masking is available (it is called differently by different vendors; here we call it a LUN masking) which logically divides a storage device into logical units (LUN) to limit an access from a host computer. As for security technology, it is common practice to use a fiber channel to establish a network connection between the host computer and the storage system. For the control of switches that are used to build the network, a technology called zoning is available. There are different types of zoning technology: a port zoning that depends on the port of a switch and WWN (World Wide Name) zoning that depends on host computer and storage system.

These technologies limit access to data stored in the storage system and thereby block unauthorized access from the host computer, thus preventing data leakage.

As for data protection technology, a WORM (Write Once, Read Many) is available which allows writing data only once and reading the written data many times but not overwriting in order to prevent falsification of data and unauthorized erasure of data. The SATA employed in many near-line storage systems has been realized by transforming the parallel transmission ATA into a serial transmission system to improve a transfer performance and expand its function (ATA-3-draft). A password system used for protecting user data in a disk is disclosed in JP-A-2004-078539.

Another security technology currently available is a password control method intended for a computer system with HDDs (hard disk drives) employing a hard disk privacy protection system in which a system BIOS (Basic Input & Output System) automatically sets a password for a particular HDD (JP-A-11-085407).

The conventional security technologies, such as LUN masking and zoning employed in a storage system having drives that are operated through a fiber channel, cannot prevent an unauthorized host computer from disguising itself as an authorized host computer and from illegally accessing the storage system, leading to possible leakage of data. To forestall this problem, it is required that the drives in the storage system themselves be able to limit access even after the storage system has been accessed. Japanese Patent Publication No. 2004-078539 ("Patent Reference 1") describes a technology in which a system BIOS automatically processes, without making the user become aware of what is going on, the setting and unlocking of a password for hard disks of a personal computer or the like that has a password setting function in conformity with ATA. This technology disclosed in Patent Reference 1, however, is intended for personal computers and currently there is no storage system available with this password system partly because it is only a short period of time since the SATA disk-mounted products have been available in the market.

The drives often used in the storage system that are operated through the fiber channel is not in the first place given a consideration for assuring a security after their network connection is established through a password.

It is therefore an object of the present invention to provide a storage system capable of preventing information leakage by using drives that can be set with passwords as a security technology after a network connection is made.

SUMMARY OF THE INVENTION

To achieve the above objective, a storage system of this invention adopts mainly the following construction. The storage system has a disk control device which comprises:

a channel control unit having an interface with a network, a disk control unit having an interface with a storage device, and a nonvolatile memory unit;

wherein the storage device has a number of storage medium;

wherein a table to manage passwords for the storage medium making up the storage device is stored in the nonvolatile memory unit;

wherein the storage medium are locked or unlocked by using the passwords at predetermined timings.

Further to achieve the above objective, the storage system of this invention comprises two storages which are in a relation of the main storage system and the sub-storage system connected over a channel. A means is provided which sets and unlocks passwords for the storage medium in the sub-storage system when information is transferred from the main storage system to the sub-storage system. A table for managing these passwords is also provided.

In a storage system comprising a storage device and a disk control device to control data transfer between the storage device and a host computer, this invention can enhance a security against information leakage.

With this arrangement, if the storage medium themselves are taken out from the storage device, it is not possible to read information in the storage medium unless the storage medium are unlocked using their passwords. Thus, a security for removable storage medium against information leakage can be enhanced.

BRIEF DESCRIPTION OF THE DRAWING

FIG. 5 is an example of a password management table.

FIG. 6 is a flow chart for setting a password when a storage system power is turned on.

FIG. 11 is a flow chart for unlocking a password when the storage system power is turned on.

DETAILED DESCRIPTION OF THE EMBODIMENTS

A disk control device as one embodiment of this invention will be described by referring to the accompanying drawings.

Figure 1:
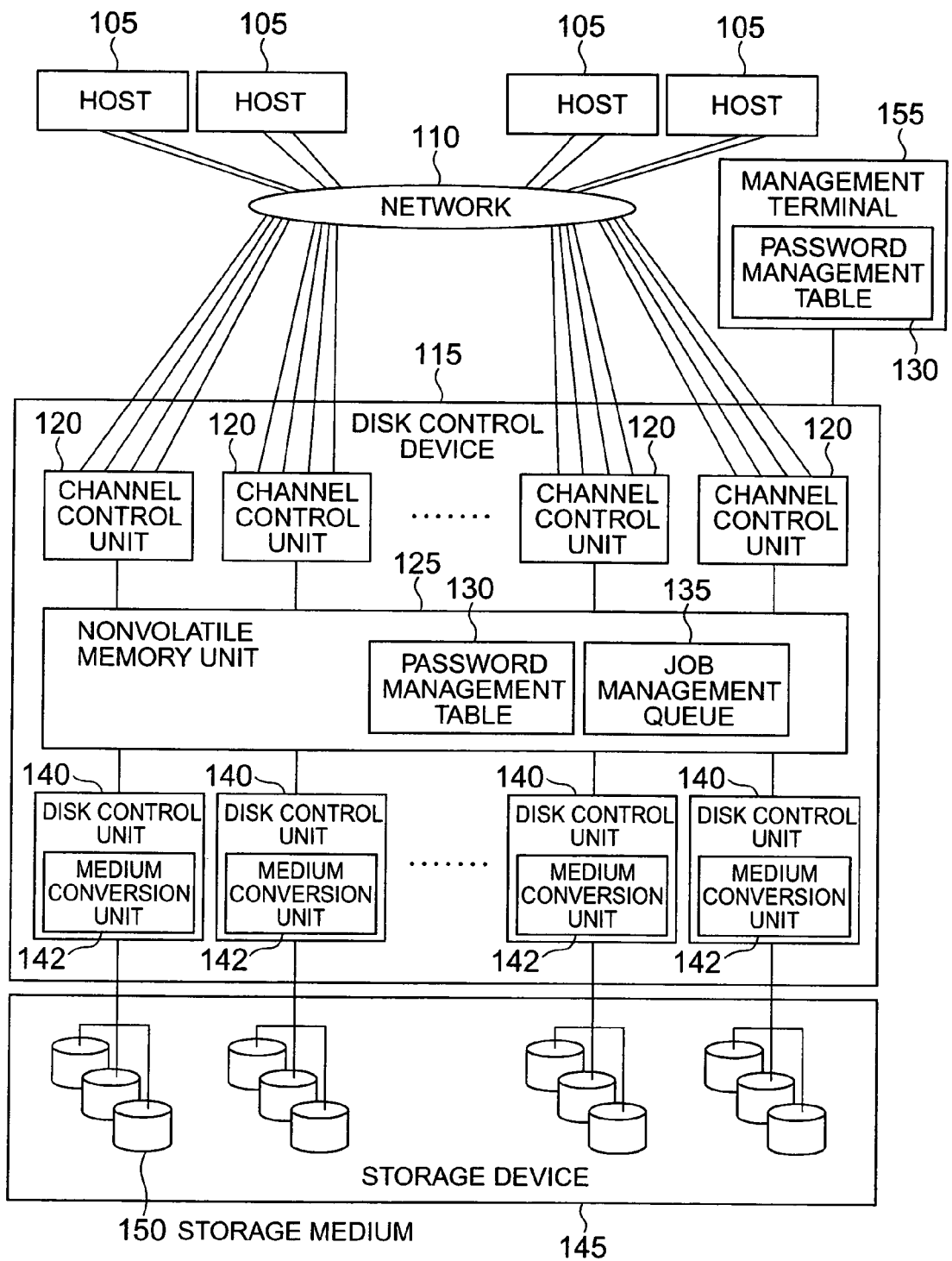
FIG. 1 is a schematic diagram showing an example configuration of the storage system.

FIG. 1 shows an example configuration of the storage system. In FIG. 1, host computers 105 (hereinafter referred to as hosts) are connected to channel control units 120 of a disk control device 115 through a network 110. The network 110 between the hosts 105 and the disk control device 115 is made up of switches and routers so that it can communicate over a fiber channel protocol and an iSCSI protocol. The disk control device 115 controls data between the hosts 105 and a storage device 145. The disk control device 115 comprises channel control units 120 having an interface with the network 110, disk control units 140 having an interface with the storage device 145, and a nonvolatile memory unit 125.

The channel control units 120 include an I/F chip to process a fiber channel protocol, an I/F chip to process an iSCSI (Internet Small Computer System Interface) protocol, and a memory as a storage area for storing firmware for these chips, data required by the firmware and temporary data transferred to and from the hosts via the network.

The nonvolatile memory unit 125 consists of a cache memory (not shown) as a temporary storage location to store data frequently accessed by the hosts 105 and data sent from the hosts 105 and a shared memory (not shown) as a storage location to store disk control units 140 management information and various control information. Although in the case of FIG. 1 the cache memory and the shared memory are managed by one nonvolatile memory unit, it is possible to provide a control unit for each of the cache memory and the shared memory to control them separately. The nonvolatile memory unit 125 includes a password management table 130 and a job management queue 135.

The storage device 145 consists of a plurality of storage medium 150. While in FIG. 1 the storage medium 150 are shown to be directly connected to the associated disk control units 140, they may be connected through a device having a hub function for future extension. The passwords for these storage medium are managed by the password management table 130 stored in the nonvolatile memory unit 125. The password management table 130 will be explained by referring to FIG. 5.

The job management queue 135 is an accumulation unit to accumulate notifications to the disk control units 140 about the processing to be performed on the storage device in response to data input/output request from the hosts 105.

The requests that the hosts 105 issue over the fiber channel protocol and the iSCSI protocol to the disk control device 115 and the storage device 145 are actually SCSI commands. Thus, a function is needed on the part of the disk control device 115 to convert SCSI commands into ATA commands for the storage device 145, which is constructed of SATA drives having a security function based on a password that is operable by a SATA command and set for the predetermined units of storage medium 150 that are to be managed with the password. This conversion function is assigned to the disk control units 140. More specifically, this function is performed by medium conversion units 142.

To allow the disk control device 115 to be changed in configuration, monitored and controlled from the outside, the disk control device 115 is provided with a management terminal 155. Here, the password management table 130 managed by the nonvolatile memory unit 125 may be managed by the management terminal 155, as shown in FIG. 1.

Figure 2:
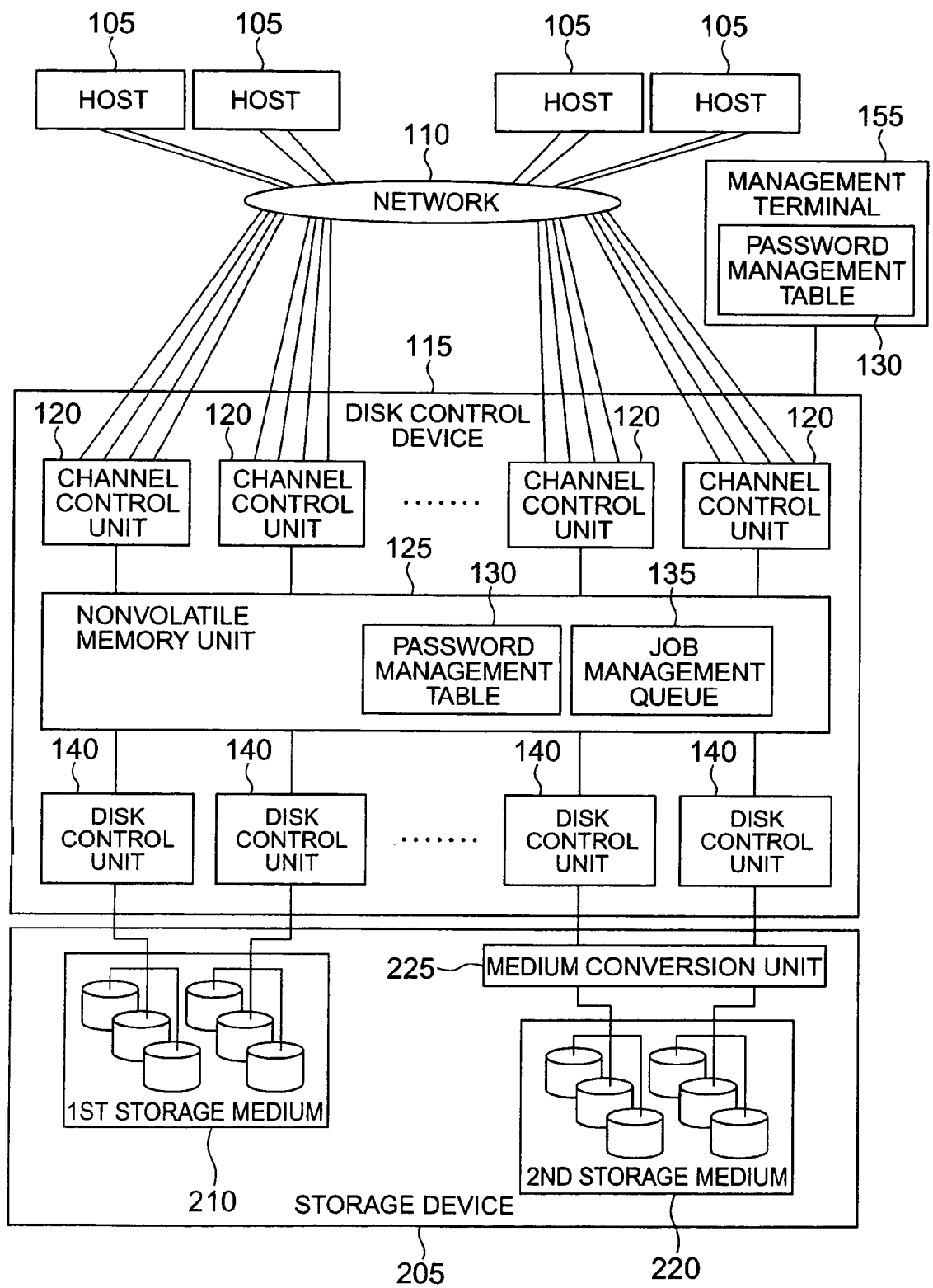
FIG. 2 is a schematic diagram showing another configuration of the storage system.

FIG. 2 shows another configuration of the storage system. Unless otherwise specifically noted, parts shown in FIG. 2 that are identical with those of FIG. 1 are given like reference numbers and their explanations omitted. When compared with FIG. 1, the configuration of a storage device 205 differs. In FIG. 1, the medium conversion units 142 that convert SCSI commands into SATA commands are provided in the disk control units 140, whereas in FIG. 2 the command conversion is done by a medium conversion unit 225 in the storage device 205. Thus, a plurality of kinds of storage medium can be mixed in the storage device 205. Denoted 210 is a first storage medium constructed as a fiber channel drive that can be directly operated by a SCSI command. The first storage medium 210 as the fiber channel drive may be loop-connected or, if possible, switch-connected. Element 220 is a second storage medium constructed as a SATA drive which, unlike the fiber channel drive, can be operated by a SATA command and has a security function using a password that is set for the predetermined units of second storage medium 220. Denoted 225 is a medium conversion unit that has a function of converting SCSI commands into SATA commands.

Figure 3:
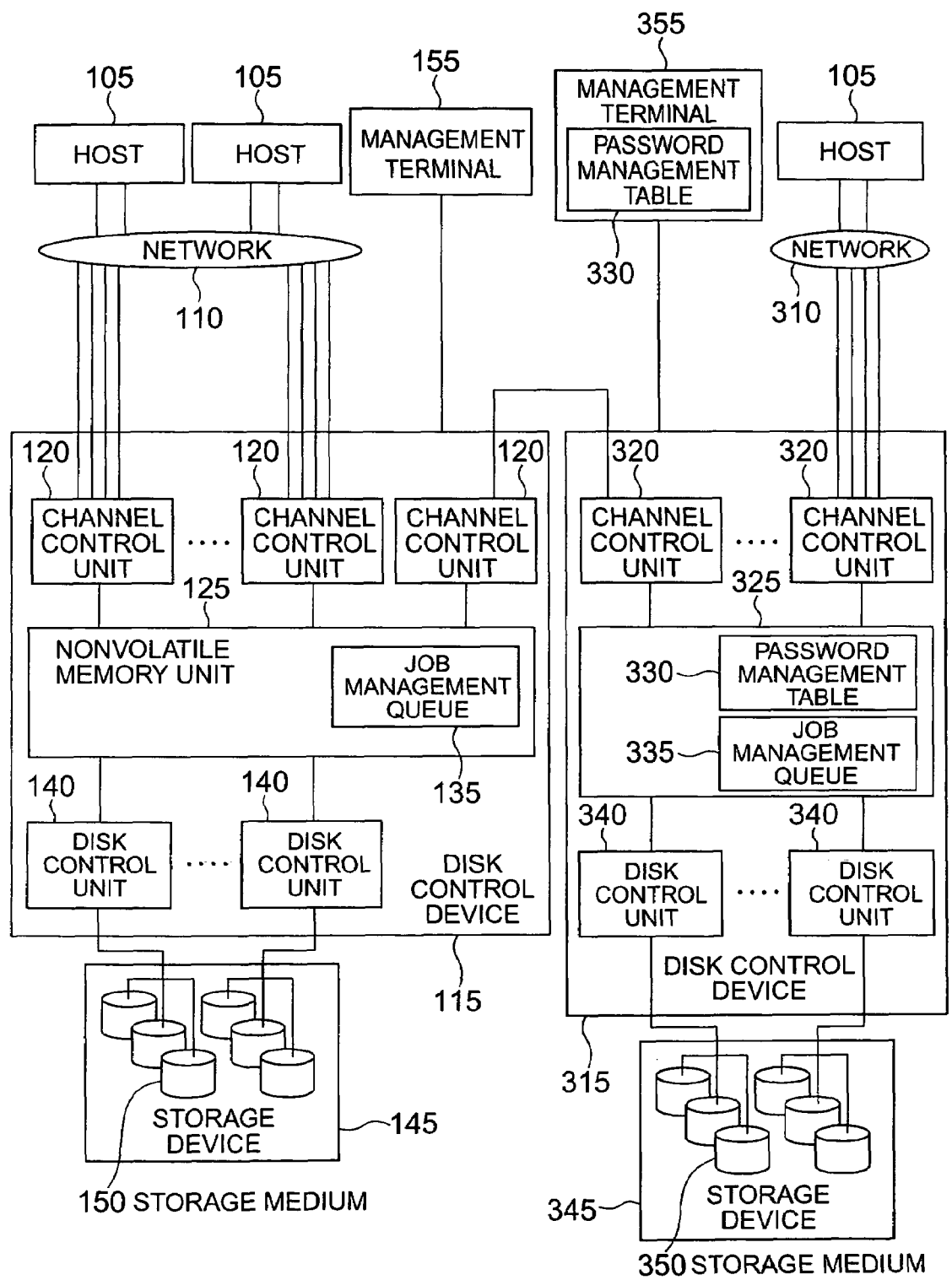
FIG. 3 is a schematic diagram showing still another configuration of the storage system.

FIG. 3 shows still another configuration of the storage system. Unless otherwise specifically noted, parts shown in FIG. 3 that are identical with those of FIG. 1 and FIG. 2 are given like reference numbers and their explanations omitted. This storage system differs from those of FIG. 1 and FIG. 2 in that there are two storage systems connected together, each made up of a disk control device 115, 315 and a storage device 145, 345. This configuration is used for a backup purpose and for the data lifecycle management described earlier. The storage medium 150 in the storage device 145 and the storage medium 350 in the storage device 345 are different medium. Suppose, for instance, that the storage medium 150 is a fiber channel drive directly operable by SCSI command and that the storage medium 350 is a SATA drive operable by SATA command and having a security function based on a password which is set in each predetermined unit of storage medium 350. Then, the passwords are set by the storage device 345. In that case, as shown in FIG. 2, the command conversion may be performed by the medium conversion unit 225 in the storage device 345. The passwords of the storage medium 350 may be managed by the disk control device 115 or the management terminal 155 in case the disk control device 315 should fail.

Now, an operation of the storage system will be explained for the construction of FIG. 1.

Figure 4:
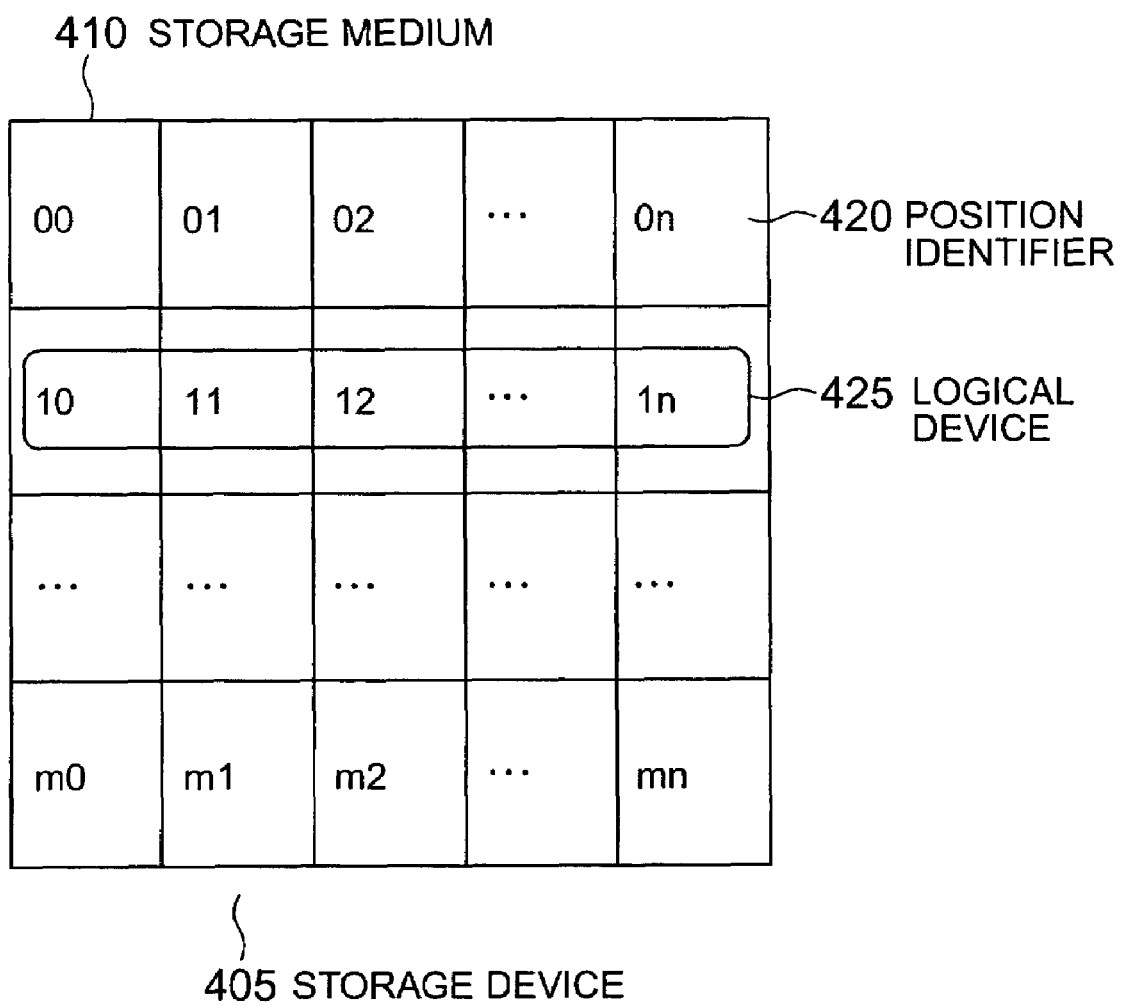
FIG. 4 is a schematic diagram of a storage device.

FIG. 4 schematically shows storage medium 410 (identical to 145 of FIG. 1) in a storage device 405 (identical to 150 of FIG. 1). Referring to FIG. 4, a security level will be explained.

In order to have the hosts 105 recognize the storage device 405, it is general practice from the standpoint of management to divide a plurality of storage medium into groups or bundles and present these bundles to the hosts for recognition. Here, each bundle of storage medium is called a logical device 425.

Here, at least three security levels are provided. The first level locks all of the storage medium 410 in the storage device 405 by using a password. The second level locks individual logical devices 425 in the storage device 405 by using different passwords. The third level locks individual storage medium 410 in the storage device 405 by using different passwords. The first level is the highest security level because the entire storage area is locked using a password. This level is most secure against information leakage. The second level, if the hosts 105 can be matched to desired logical devices, allows a password setting to be enabled or disabled for individual hosts 105. The third level makes it possible to apply a password only to a key storage medium in the storage device 405. Setting these levels can respond flexibly to user demands. The number of storage medium mounted in the storage system normally extends to as many as several thousand. Setting passwords does not pose much of a problem if the storage mediums involved are two or three. Handling the password setting for several thousand storage medium, however, can take lots of time and labor. Rather than setting passwords to all storage medium, which indeed increases the strength of security, there are cases where data can be protected by applying a password to only a certain range of medium. Making different levels of security available can deal with this case.

FIG. 5 shows an example of the password management table. Reference number 510 represents a storage medium position which contains a position identifier 420 of FIG. 4. Denoted 515 is a logical device identifier which contains an identifier assigned to each unit (logical device) of logical partitions of the storage device. In FIG. 5, "00" and "01" in the storage medium position 510 together form a single logical device, which is assigned a logic device identifier "0". Denoted 520 is a password PW which contains a password applied to the associated storage medium. A password may be set for each storage medium or for each logical device. It is also possible to set a unified password for the whole storage device. In that case, the same passwords are entered in the password PW 520 column for all storage medium positions. If the same passwords are to be set for all medium positions, the area of nonvolatile memory used may be reduced by creating a password field separate from this table, instead of providing a password PW 520 column such as shown in FIG. 5 and by setting the passwords in this field. Element 525 is a unit of range covered by a password. For example, if a password is set for each storage medium, the storage medium" constitutes the range unit. If a password is set for each logical device, the range unit is the "logical device". Here, if a "logical device" is specified and its passwords registered in the password PW 520 differ, the password for the storage medium with the smallest medium position is used. Reference number 530 indicates whether the security setting/unlocking is enabled or disabled. Not only is this column used to specify whether the security setting to the storage medium is enabled or disabled, it also provides a reference for judgment when the storage system, when storage system is power-on, decides which storage medium should be set with a password. With such a table it is possible to manage what password should be set to which storage medium or logical device.

Figure 6:
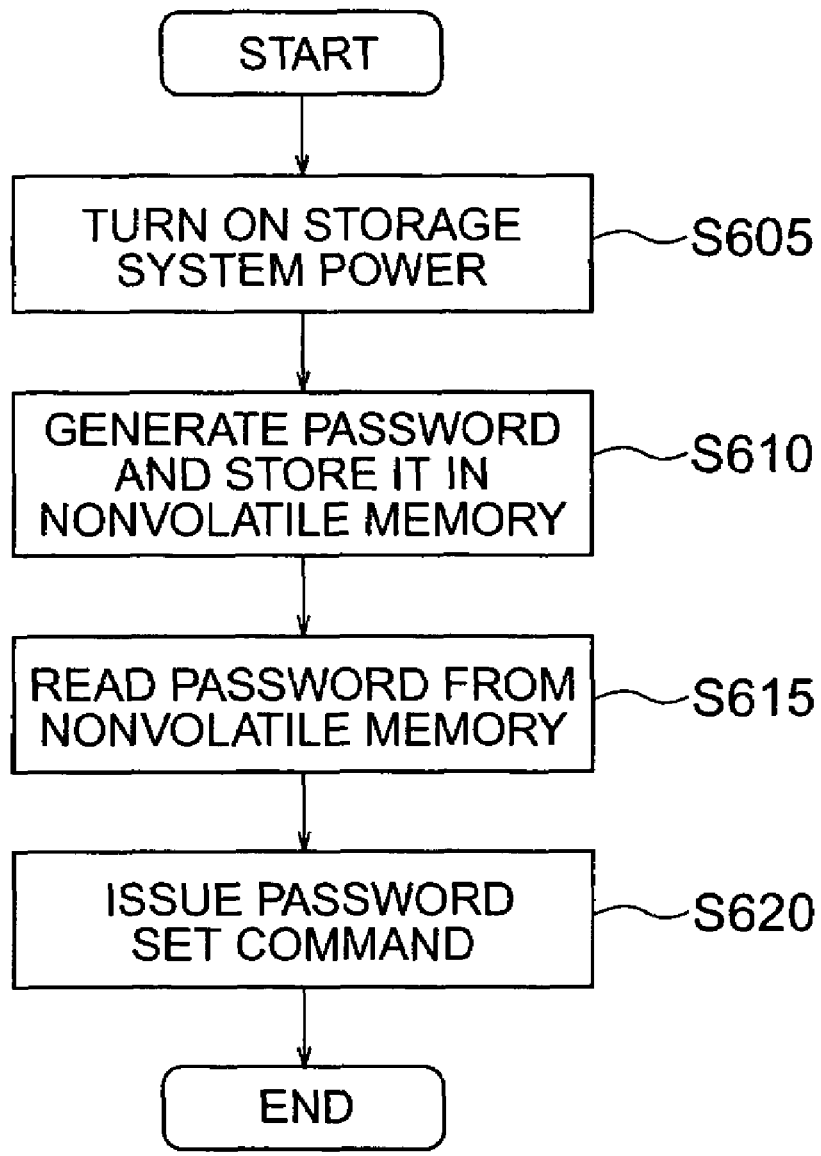

FIG. 6 shows a password setting flow when power of the storage system is turned on. First, when the storage system power is turned on (step S605), the storage system creates a password and stores it in the nonvolatile memory (step S610). Here the password may be created by the channel control unit or the disk control unit in the storage system. The password generation may use random numbers or physical positions of the storage medium as a key. The disk control device reads the generated password from the nonvolatile memory (step S615) and issues a password set command to the storage medium, before exiting this process.

Figure 7:
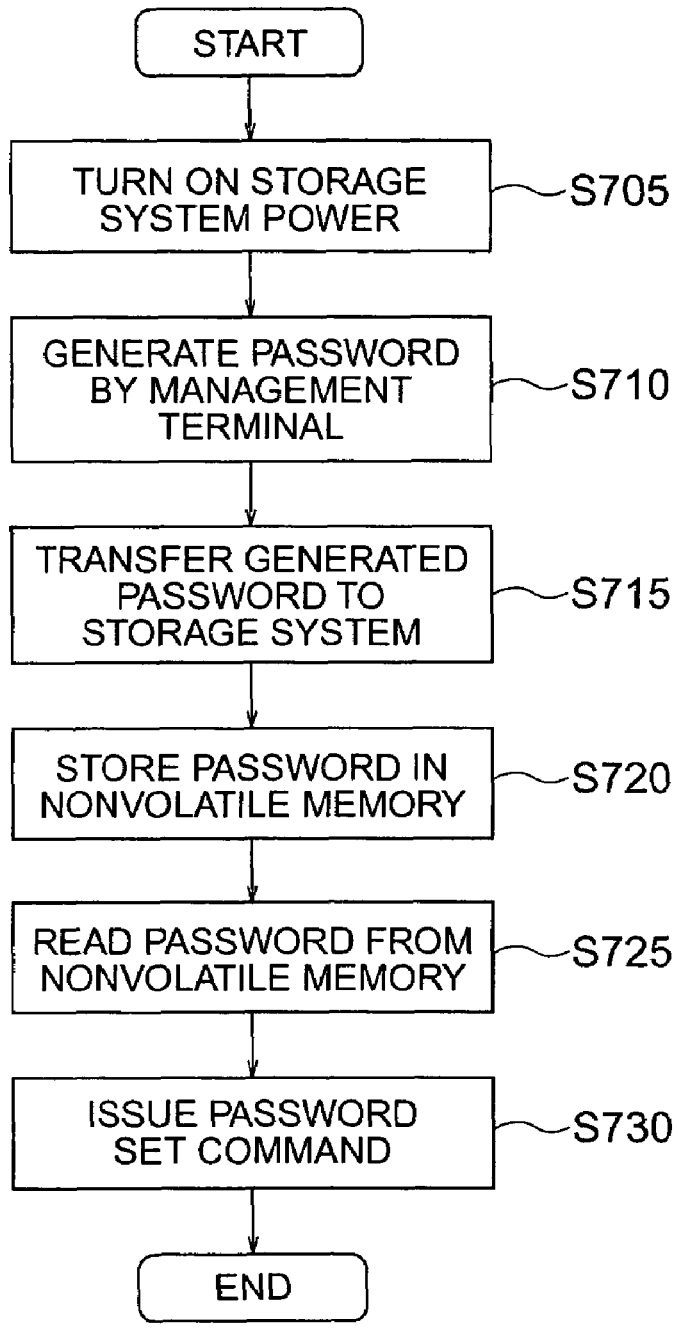
FIG. 7 is a flow chart for setting a password when the storage system power is turned on, with passwords managed by a management terminal.

FIG. 7 shows a password setting flow chart when the storage system power is turned on and the passwords are managed by the management terminal. First, when the storage system power is turned on (step S705), the management terminal generates a password (step S710). The password generation may use random numbers or physical positions of the storage medium as a key. The generated password is transferred to the nonvolatile memory of the storage system (step S715) where it is stored in the password column in the password management table (step S720). Then, the disk control unit reads the password from the nonvolatile memory (step S725) and issues a password set command to the storage medium (step S730), before exiting this process.

Figure 8:
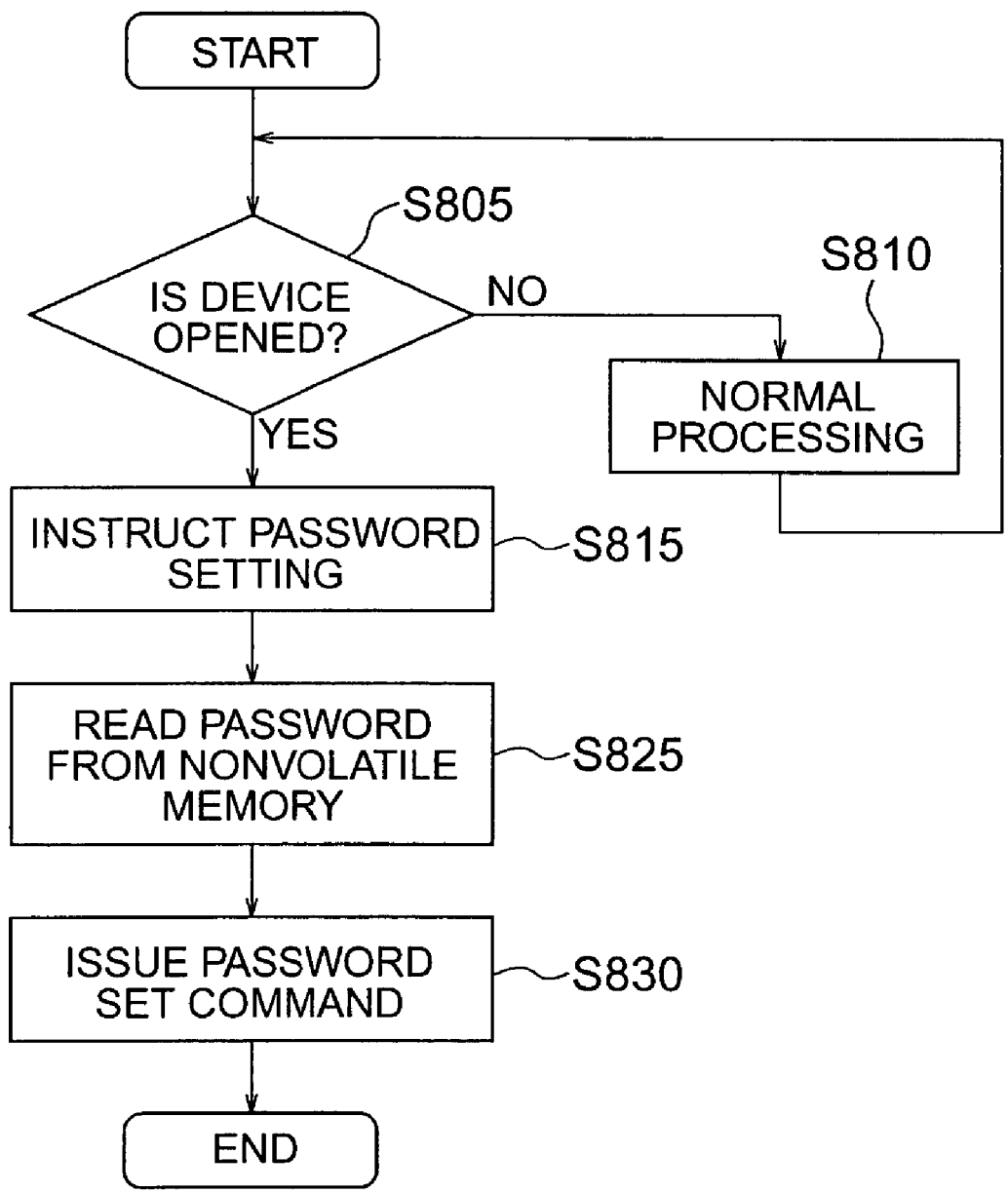
FIG. 8 is a flow chart for setting a password when the storage system door is opened.

FIG. 8 shows a password setting flow performed when a door of the storage system device is opened. FIG. 8 shows a process performed when a SATA drive is removed from the storage device.

A check is made to see if the door of the device is open (step S805). If the door is found open, the management terminal or channel control unit in the storage system issue a password setting instruction to the disk control unit through a job management queue such as stop processing (step S815). If not, normal processing is executed (step S810). The disk control unit reads the password from the nonvolatile memory (step S825) and issues a password set command to the storage medium (step S830), before terminating the process.

Figure 9:
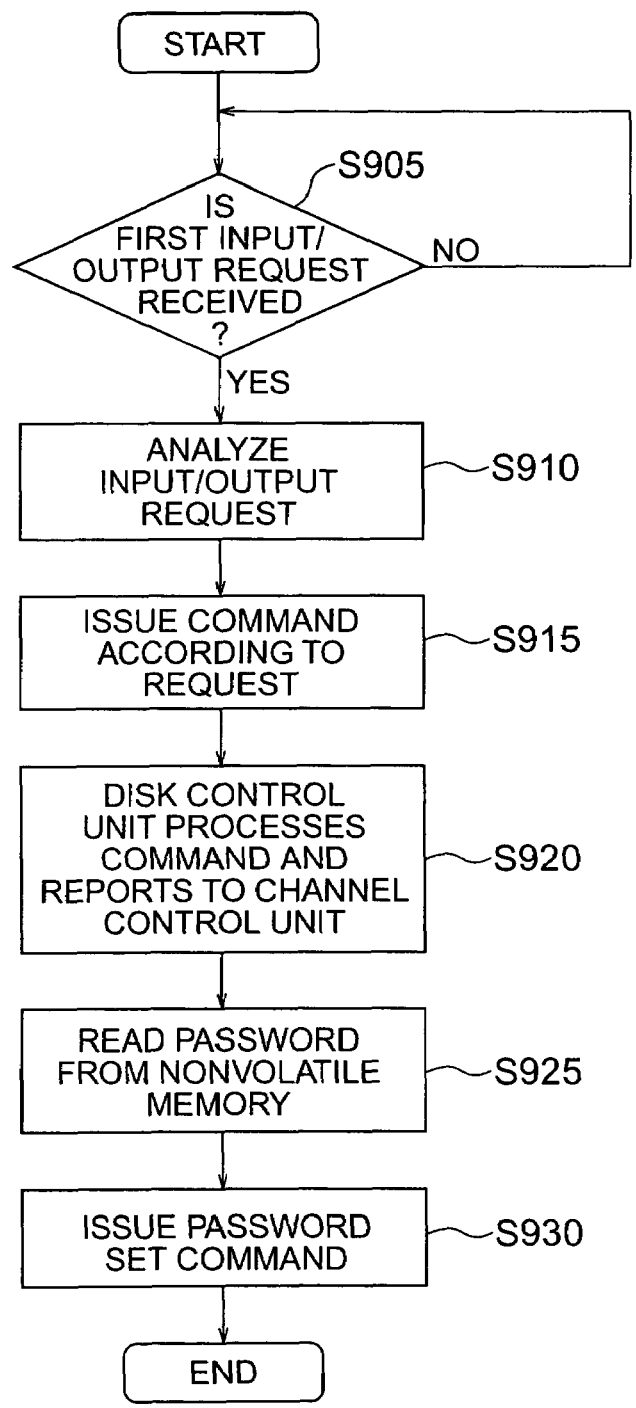
FIG. 9 is a flow chart for setting a password when a first input/output request from a host computer is received by the storage system.

FIG. 9 is a flow chart showing processing performed when the storage system receives a first input/output request from a host. When the channel control unit receives a first input/output request from a host (step S905), it analyzes the received input/output request (step S910) and registers its content with a job management queue (step S915). The disk control unit executes the processing registered in the job management queue and reports the result of processing to the channel control unit which in turn sends the result to the host (step S920). Then, the disk control unit reads from the nonvolatile memory a password for the storage medium or logical device in question on which the processing was executed (step S925), and issues a password set command to the storage medium or logical device (step S930). The processing is now exited. This is followed by processing that handles the input/output request.

Figure 10:
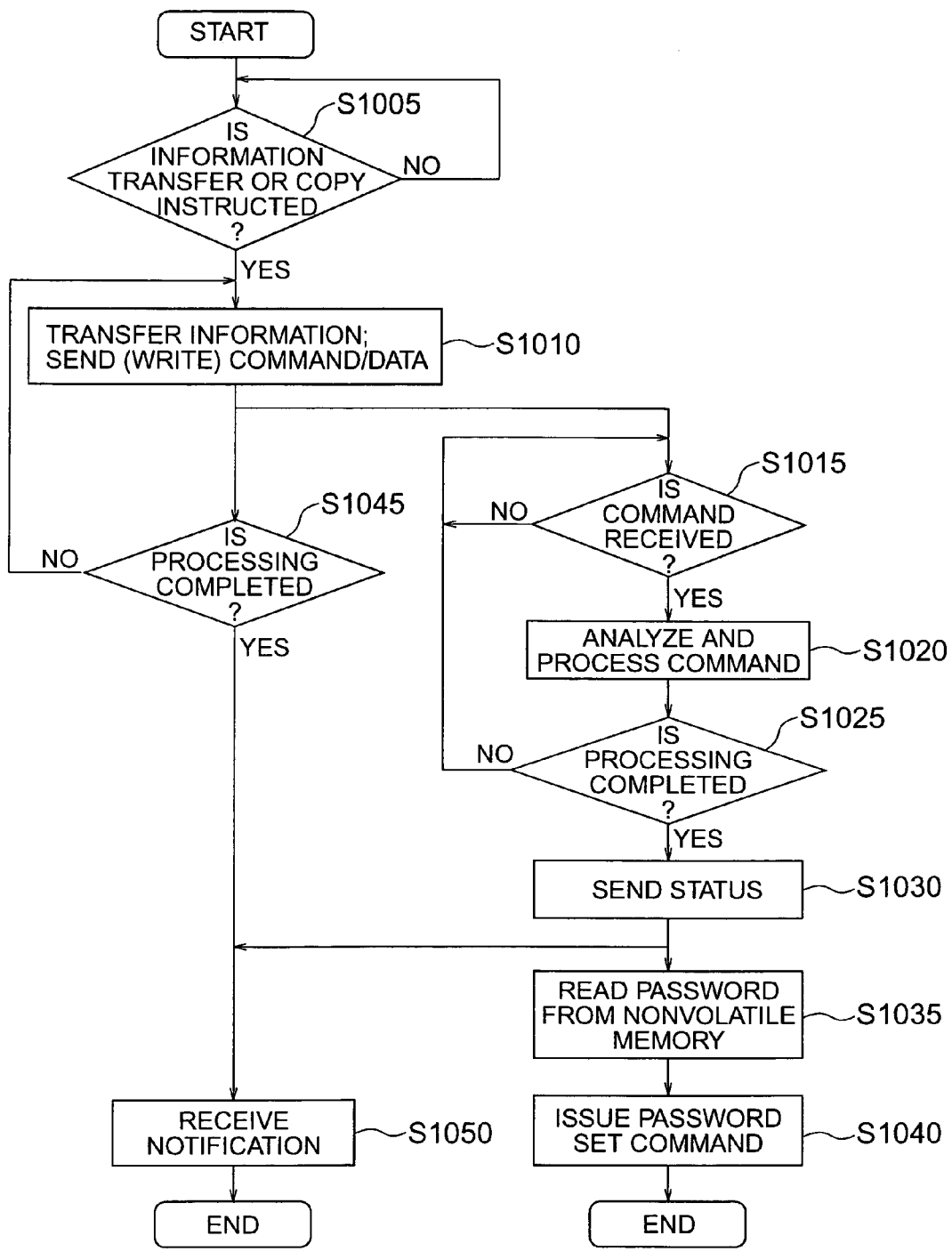
FIG. 10 is a flow chart for setting a password on a destination storage system when information is instructed to be transferred or copied from one of two storage systems to the other.

FIG. 10 is a flow chart showing a sequence of steps to set a password for a storage medium in a destination storage system when information is instructed to be transferred or copied from one storage system to another. Here, it is assumed that a source storage system from which the information is to be transferred or copied is a first storage system and that a destination storage system to which the information is to be transferred or copied is a second storage system. When the management terminal instructs a transfer or copy of information (step S1005), the first storage system issues a command to the second storage system (step S1010). This command is a write command. If the second storage system is determined whether the storage system has received the command (step S1015) and, if so, the received command is analyzed and processed (step S1020). Until this processing is completed (step S1045), steps S1015 and S1020 are repeated. When the processing is finished, the second storage system sends a status of the processing to the first storage system (step S1030). The first storage system receives the status from the second storage system and analyzes the status (step S1050), before ending the processing. In the second storage system the disk control device reads a password from the nonvolatile memory (step S1035) and issues a password set command to the storage medium or logical device in question (step S1040). Then, the processing for the second storage system is ended.

Figure 11:
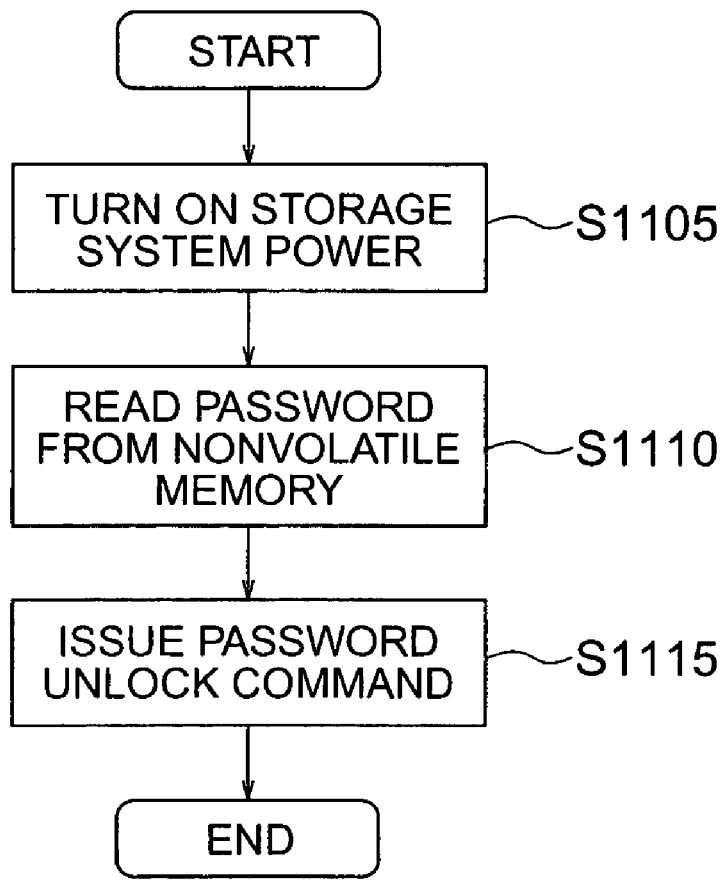

FIG. 11 is a flow chart for unlocking a password when the storage system power is turned on. When the storage system power is turned on (step S1105), the disk control device reads a password from the nonvolatile memory (step S1110) and issues an unlock command to the storage medium or logical device in question (step S1115), before ending the processing.

Figure 12:
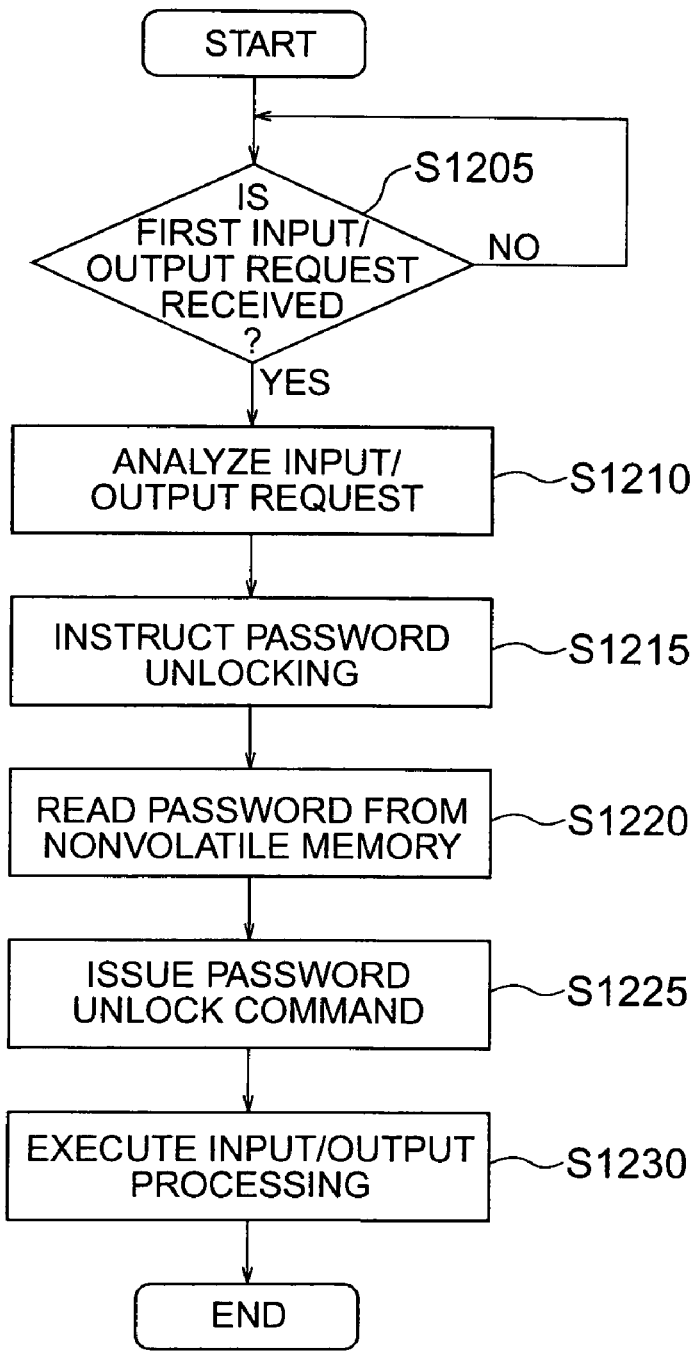
FIG. 12 is a flow chart for unlocking a password when a first input/output request for a storage medium or logical device is received from a host.

FIG. 12 is a flow chart for unlocking a password when a first input/output request for a storage medium or logical device is received from a host. When a first input/output request from a host is received, the request is analyzed (step S1210). The channel control unit instructs, through a job management queue, the disk control unit to unlock a password (step S1215). The disk control unit reads a password for the storage medium or logical device in question from the nonvolatile memory (step S1220) and issues a password unlock command (step S1225). Subsequent processing is executed according to the content of the received input/output request (step S1230).

Figure 13:
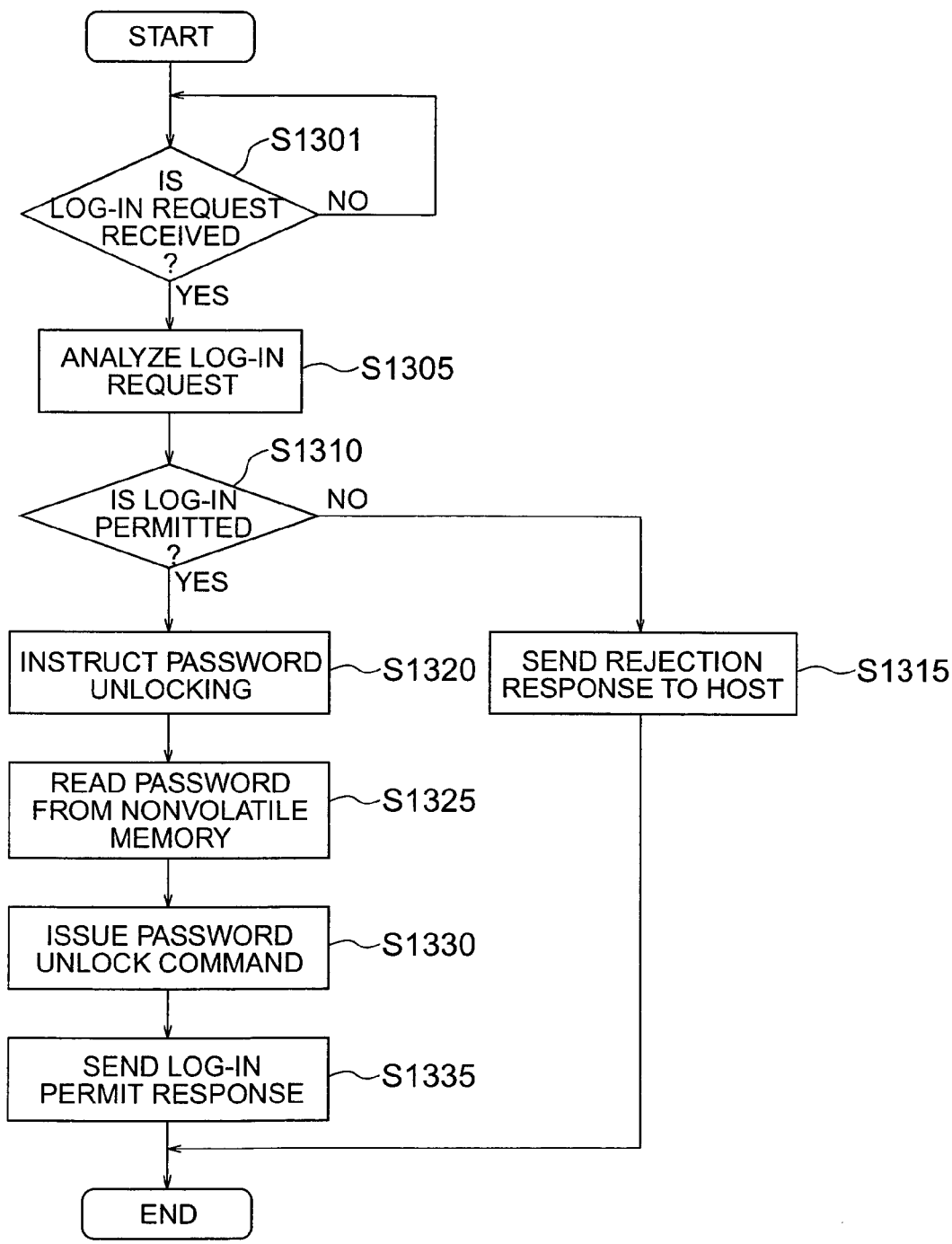
FIG. 13 is a flow chart for unlocking a password when a log-in request for a storage medium or logical device in the storage system is received from a host.

FIG. 13 is a flow chart for unlocking a password when a log-in request for a storage medium or logical device in the storage system is received from a host. In the following, iSCSI that requires log-in processing is taken up for example. The host and the storage medium and logical devices in the storage system are assigned unique identifiers called iSCSI Names. The iSCSI Names may be managed by creating, for example, an iSCSI Name column in the password management table of FIG. 5. When the storage system receives a log-in request containing its own iSCSI Name (step S1301), it analyzes the log-in request (step S1305). For security, it is checked whether the iSCSI Name contained in the log-in request is authorized (step S1310). If so, the storage system instructs the disk control unit to unlock a password (step S1320). If not, a reject response is returned to the host (step S1315) before exiting the processing. The disk control unit reads a password of the storage medium or logical device of interest from the nonvolatile memory (step S1325) and issues a password unlock command (step S1330). As a last step a log-in permit response is returned to the host (step S1335), before exiting the processing.

Figure 14:
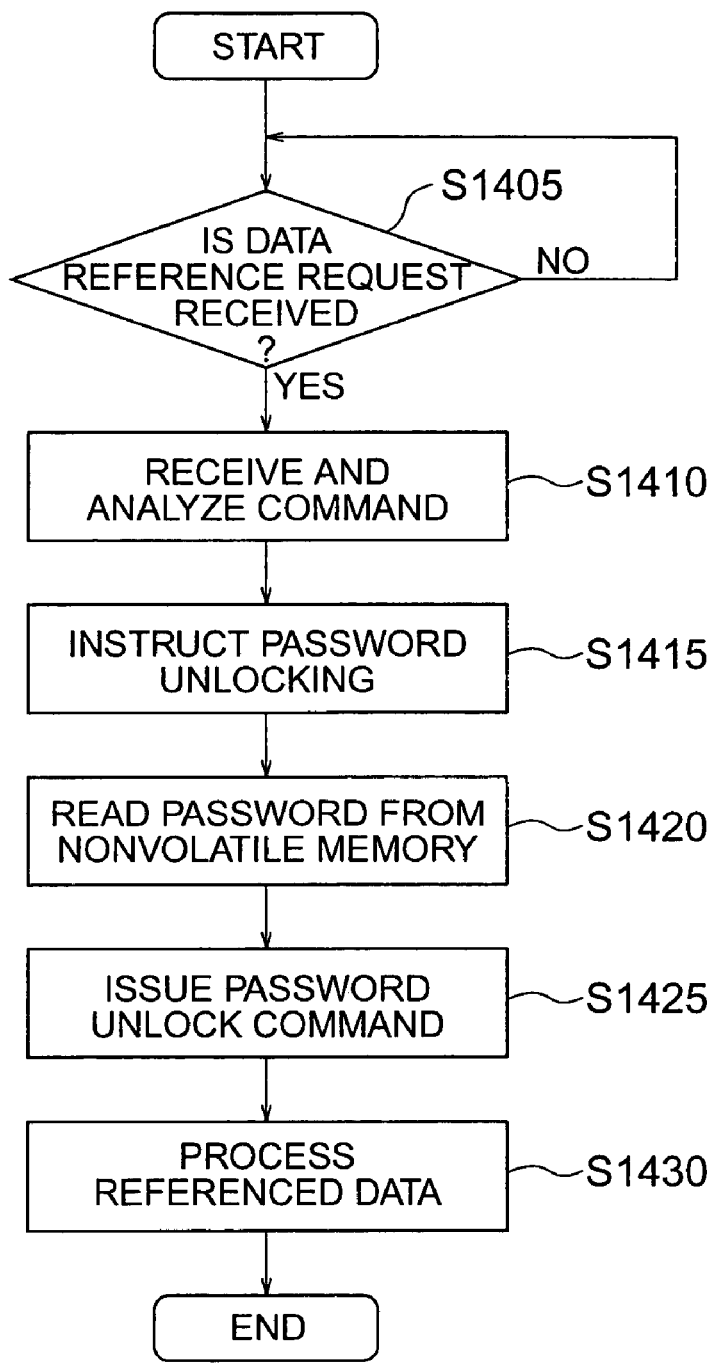
FIG. 14 is a flow chart for unlocking a password for a storage medium or logical device in a second storage system when data, which was transferred from a first storage system to the second storage system and stored there, is referenced.

FIG. 14 is a flow chart showing a sequence of steps to unlock a password for a storage medium or logical device in a second storage system when referred to the data in the second storage system, when the data stored in the first storage system was transferred to the second storage system and stored there. It is assumed that the second storage system is connected with a host via a network in addition to the first storage system. When the second storage system receives a data reference request from the first storage system or the host (step S1405), it analyzes the request (step S1410). The channel control unit in the second storage system instructs the storage medium or logical device in question to unlock a password (step S1415). The disk control unit reads the password of the storage medium or logical device from the nonvolatile memory (step S1420) and issues a password unlock command (step S1425). After this, processing is executed according to the content of the data reference request (step S1430).

Figure 15:
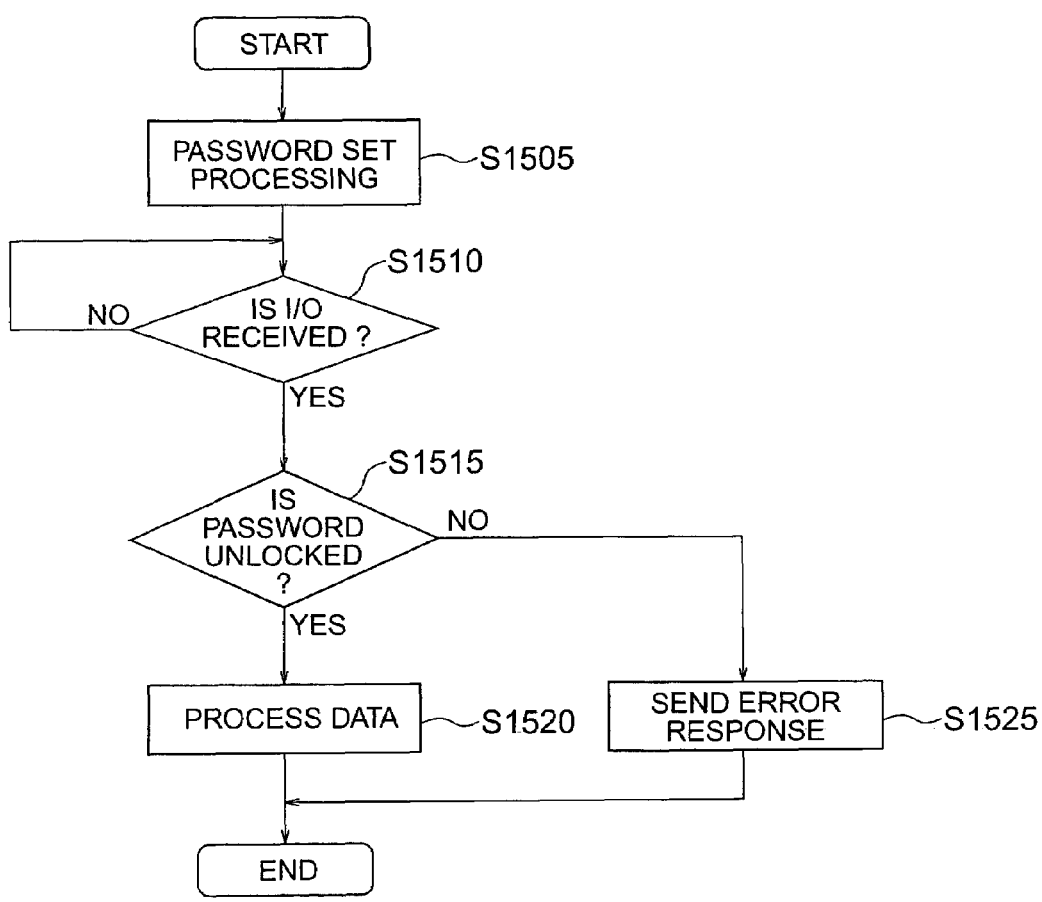
FIG. 15 is a flow chart for reading data after a password has been set.

FIG. 15 is a flow chart for reading data after a password has been set. FIG. 15 shows the processing performed by the storage system when the host requested to data in the storage system after a password has been set.

In FIG. 15, the disk control device in the storage system performs password setting processing (step S1505). When a request to read data is made by a host (step S1510), the disk control device checks whether the password is unlocked (step S1515). If the password is found unlocked, processing is done in response to the data read request (step S1520). If the password is found locked, an error is returned to the host (step S1525) and then the processing is ended.

In a storage system comprising a storage device made up of storage medium that can be set with a password and a disk control device, not only can this embodiment enhance a security simply by setting a password but it can also provide a security function that meets the needs of a user who has introduced this system by allowing the user to set parameters, such as one specifying a range covered by the password or one enabling or disabling the password setting.

In the above embodiment, the disk control device of the storage system issues a password set command and a created password is stored in the password management table 130 of the non-volatile memory unit 125 in the disk control device to lock the storage device so that only when the password is correct, is a data read or write operation on the storage device permitted. Thus, if a removable SATA drive, which is operable by a SATA command and has a security function based on a password set for every predetermined unit of storage medium 220, should be removed from the storage device, the set password can protect the removed SATA drive against information leakage.

As for who sets a password, there is no particular limitation. Only at the startup, the disk control unit may be given a priority in setting a password and other password setting entities may include the channel control unit and the management terminal. The order of priority for password setting entities has the disk control unit at the top, followed by the channel control unit at the second and the management terminal at the third.

When unlocking the password, a check is made as to whether the access is made by an authorized host in order to enhance the security. The timings of password setting and unlocking may be made identical or different.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A storage control method in a storage system having a disk control device and a storage device, the storage control method for locking storage medium in the storage device by using a password comprising:
   a step in which, when a power of the storage system is turned on and the storage system begins to be initialized, the storage system generates a password and stores the password in a nonvolatile memory of the disk control device;
   a step in which a disk control unit in the disk control device managing a plurality of storage medium reads the password from the nonvolatile memory; and
   a step in which the disk control unit issues a password set command to the storage medium by using the password read out.

2. A storage control method in a storage system having a disk control device and a storage device, the storage control method for locking storage medium in the storage device by using a password comprising:
   a step in which a management terminal connected to the storage system generates a password for storage medium and stores the password in a nonvolatile memory in the disk control device;
   a step in which a disk control unit in the disk control device managing a plurality of storage medium reads the password from the nonvolatile memory; and
   a step in which the disk control unit issues a password set command to the storage medium by using the password read out.

3. A storage control method in a storage system having a disk control device and a storage device, the storage control method for locking storage medium in the storage device by using a password comprising:
   a step in which a channel control unit or a disk control unit in the disk control device detects when a door of the storage system is opened;
   a step in which, when the channel control unit detects the open door, the channel control unit instructs through a job management queue the disk control unit to set a password for the storage medium;
   a step in which the disk control unit reads the password from a nonvolatile memory in the disk control device; and
   a step in which the disk control unit issues a password set command to the storage medium by using the password read out.

4. A storage control method in a storage system having a disk control device and a storage device, the storage control method for locking a logical device in the storage device by using a password comprising:
   a step in which the storage system receives from a host computer a first input/output request for the logical device;
   a step in which a channel control unit and a disk control unit in the disk control device process the input/output request and the channel control unit reports a completion of the request processing to the host computer;
   a step in which the disk control unit reads a password from a nonvolatile memory in the disk control device; and
   a step in which the disk control unit issues a password set command to the storage medium by using the password read out.

5. A storage control method in a storage system having a disk control device and a storage device made up of first and second storage medium, the storage control method for locking the second storage medium by using a password after information has been copied or transferred from the first storage medium to the second storage medium, comprising:
   a step in which a management terminal connected to the storage system instructs the storage system to transfer or copy information from the first storage medium to the second storage medium;
   a step in which a channel control unit in the disk control device instructs through a job management queue a disk control unit in the disk control device to transfer or copy information from the first storage medium to the second storage medium;
   a step in which the disk control unit transfers or copies the information from the first storage medium to the second storage medium according to an instruction by the channel control unit;
   a step in which the disk control unit reads a password for the second storage medium from a nonvolatile memory in the disk control device; and
   a step in which the disk control unit issues a password set command to the second storage medium by using the password read out.

6. A storage control method in a storage system having a disk control device and a storage device, the storage control method for unlocking storage medium in the storage device by using a password comprising:
   a step in which a generation of a predetermined timing associated with an operation of the storage system is detected by a channel control unit;
   a step in which, when the channel control unit detects the timing generation, it notifies the timing generation to the disk control unit;
   a step in which the disk control unit reads an appropriate password from a password management table on a nonvolatile memory in the disk control device; and a step in which the disk control unit issues a password unlock command to the storage medium by using the password read out.

7. A storage control method in a storage system having a disk control device and a storage device, wherein the storage device is logically partitioned into resources called logical devices, the storage control method for unlocking storage medium making up a logical device by using a password comprising:
- a step in which a channel control unit in the disk control device receives a log-in request for the logical device from a host computer;
- a step in which the channel control unit analyzes the received log-in request to determine if the received log-in request is from an authorized host computer;
- a step in which, if the channel control unit decides that the received log-in request is an authorized one, the channel control unit instructs a disk control unit in the disk control device to unlock the storage medium making up the logical device;
- a step in which the disk control unit reads an appropriate password from a password management table on a nonvolatile memory in the disk control device; and
- a step in which the disk control unit issues a password unlock command to the storage medium making up the logical device by using the password read out.

8. A storage control method in a storage system having a disk control device and a storage device, wherein the storage device is logically partitioned into resources called logical devices, the storage control method for unlocking storage medium making up a logical device by using a password comprising:
- a step in which a channel control unit in the disk control device receives a first input/output request from a host computer via a network;
- a step in which the channel control unit analyzes the received first input/output request and notifies processing of the request through a job management queue to the disk control unit in the disk control device;
- a step in which the disk control unit reads an appropriate password from a password management table on a nonvolatile memory in the disk control device; and
- a step in which the disk control unit issues a password unlock command to the storage medium making up the logical device by using the password read out.

9. A storage system connected to a network and having a storage device and a disk control device to control an operation of the storage device;
- wherein the storage device has a security function using a password set for each management unit of storage medium;
- wherein means to set and unlock the password and a medium conversion unit are provided to convert
- a first command for the storage device into a second command using the password for the storage device;
- wherein a password management table to manage the password is provided on a nonvolatile memory in the disk control device;
- wherein a range in the storage device covered by the password can be variably specified according to a security level;
- wherein the password setting and unlocking means can set and unlock the password at a predetermined timing based on an operation on the storage device.

* * * * *